United States Patent [19]

DeMonbrun et al.

[11] 4,237,090
[45] Dec. 2, 1980

[54] METHOD FOR INHIBITING CORROSION IN AQUEOUS SYSTEMS

[75] Inventors: James R. DeMonbrun, Knoxville; Charles R. Schmitt; James M. Schreyer, both of Oak Ridge, all of Tenn.

[73] Assignee: The United States of America as represented by the United States Department of Energy, Washington, D.C.

[21] Appl. No.: 960,982

[22] Filed: Nov. 15, 1978

[51] Int. Cl.$^3$ .............................. C02F 1/50; C02F 5/12; C23F 11/06; C23F 11/18
[52] U.S. Cl. ........................................ 422/13; 422/16; 252/180; 252/181; 252/387; 210/698/ 210/764
[58] Field of Search ........................ 422/12, 13, 14, 16, 422/18; 210/58, 60, 62, 64; 252/387, 180, 181

[56] References Cited

U.S. PATENT DOCUMENTS

| | | | |
|---|---|---|---|
| 1,566,118 | 12/1925 | Rawling | 422/12 |
| 2,877,188 | 3/1959 | Liddell | 422/16 |
| 2,961,292 | 11/1960 | Ackett et al. | 422/16 |
| 3,335,096 | 8/1967 | Hatch | 252/389 R |
| 3,336,221 | 8/1967 | Ralston | 210/58 |
| 3,671,448 | 6/1972 | Kowalski | 422/16 |
| 4,098,720 | 7/1978 | Hwa | 422/16 |

OTHER PUBLICATIONS

"Metallic Corrosion Ihnibitors", Putilova et al., Pergamon Press (1960), pp. 149-151, 170, 171.
"Aluminum", *Solar Age* (S-1977), pp. 30 and 31.
"The Ice Bin Cometh", Krause, ORNL, pp. 18-23, 1975.

*Primary Examiner*—Bradley R. Garris
*Attorney, Agent, or Firm*—James E. Denny; Stephen D. Hamel; Fred O. Lewis

[57] ABSTRACT

This invention is a method for inhibiting corrosion in aqueous systems containing components composed of aluminum, copper, iron, or alloys thereof. The method comprises (a) incorporating in the aqueous medium 2-10 ppm by weight of tolyltriazole; an effective amount of a biodegradable organic biocide; 500-1000 ppm by weight of sodium metasilicate; 500-2000 ppm by weight of sodium nitrite; and 500-2000 ppm by weight of sodium tetraborate, all of these concentrations being based on the weight of water in the system; and (b) maintaining the pH of the resulting system in the range of 7.5 to 8.0. The method permits longterm operation with very low corrosion rates and bacteria counts. All of the additives to the system are biodegradable, permitting the treated aqueous medium to be discharged to the environment without violating current regulations. The method has special application to solar systems in which an aqueous medium is circulated through aluminum-alloy heat exchangers.

5 Claims, No Drawings

METHOD FOR INHIBITING CORROSION IN AQUEOUS SYSTEMS

This invention was made in the course of, or under, a contract with the U.S. Department of Energy.

The invention relates broadly to methods for inhibiting the corrosion of metals exposed to aqueous liquids. More particularly, it relates to a method for inhibiting such corrosion by (a) incorporating in the aqueous medium selected concentrations of non-toxic, water-soluble agents for inhibiting chemical corrosion and the growth of microorganisms and (b) maintaining the pH of the resulting solution in a selected range by the addition of an acid which introduces no foreign ions to the additive-containing solution.

The term "aqueous system" is used herein to include a system comprising metallic materials which are exposed to a static or circulating aqueous liquid, such as demineralized water or an aqueous solution. Unless otherwise qualified, the term "corrosion" is used herein to include corrosion resulting from chemical action and/or the action of microorganisms.

BACKGROUND OF THE INVENTION

This method for inhibiting corrosion has special application to aqueous systems containing one or more of the following metallic materials: aluminum, copper, iron, and their respective alloys. The invention was developed in response to a need for maintaining recirculating 20% water-methanol solutions in a relatively corrosion-free and aseptic condition for extended periods. A 20% methanol-water solution had been selected as the heat-exchange medium for use in two types of experimental demonstration houses: a solar-heated house and a so-called ACES house heated and cooled by means of an Annual Cycle Energy System (*The ORNL Review*, fall issue, 1975, Oak Ridge National Laboratory, Oak Ridge, Tennessee). However, experiments conducted in closed systems demonstrated that when various metallic components were exposed to recirculating methanol/tap-water solutions for relatively short periods, the components corroded to such a degree that satisfactory long-term operation could not be expected. Aluminum-alloy components, such as heat exchangers and solar-heat-absorption panels, were found to be especially vulnerable to attack.

Tests established that the corrosion was caused both by chemical agents and the action of microorganisms (e.g., bacteria). As a specific illustration, a heat exchanger composed of Type 1100 aluminum alloy was exposed to recirculating 20% methanol-water (potable tap water) solution; within a month the exchanger developed pinholes. In another test conducted with the same type of solution, anaerobic bacteria in the closed system multiplied to the extent that the system became dangerously septic, exhibiting bacterial counts as high as 10,000,000 per milliliter. Bacterial action destroyed an aluminum-alloy screen in the system.

OBJECTS OF THE INVENTION

It is an object of this invention to provide an effective method for inhibiting the corrosion of aluminum, iron, copper, and their alloys in aqueous systems.

It is another object to provide a method for inhibiting such corrosion by incorporation in the solutions environmentally acceptable additives which inhibit chemical corrosion and the growth of microorganisms.

It is another object to control the pH of the solution containing said additives by the addition of an acid which introduces no foreign ions to the solution.

SUMMARY OF THE INVENTION

The invention may be summarized as follows: In a system containing an aqueous liquid the method of inhibiting corrosion of a metallic material selected from the group consisting of iron, aluminum, copper, and their alloys, said method comprising: (a) incorporating in said system: 2–10 ppm by weight of tolyltriazole; an effective amount of a biodegradable organic biocide; 500–1000 ppm by weight of sodium metasilicate; 500–2000 ppm by weight of sodium nitrite; and 500–2000 ppm by weight of sodium tetraborate, all of these concentrations being based on the weight of water in said system, and (b) maintaining the pH of the resulting aqueous solution at a value in the range of from 7.5 to 8.0 by the addition of boric acid.

DESCRIPTION OF THE PREFERRED EMBODIMENT

This invention is generally applicable to inhibiting the corrosion of metallic materials in aqueous systems, but for brevity it will be illustrated chiefly as utilized in systems in which a methanol-water solution is circulated.

EXAMPLE 1

In this experiment the invention was used to maintain an unusually low level of corrosion in an aqueous system in which 2424 gallons of 20% methanol-water solution was to be circulated continuously through a closed loop linking an aluminum alloy (Type 1100) solar panel and a polyethylene heat exchanger. The water incorporated in the solution had previously been softened to remove calcium hardness. The loop included steel piping, copper alloy fittings, and aluminum-alloy heat exchangers.

In accordance with this invention, at the start of the test the following were added to the methanol-water solution: tolyltriazole, 5 ppm; biodegradable organic biocide, 30 ppm; and sodium tetraborate, 1000 ppm (all concentrations in terms of weight, based on the weight of water in the methanol-water solution). After addition of these additives, the pH of the solution was 10.8. Boric acid then was added to adjust the pH to 7.8. For test purposes, coupons of known weight were mounted in the loop so as to be immersed in the circulated solution; these coupons were composed respectively of pure copper metal, aluminum alloy (Type 1100), and low-carbon steel. During operation of the loop the solution temperature was in the range of 25° to 150° F. Periodically, the bacterial count in the solution was measured by means of a commercial technique ("Easicult-S", Orion Diagnostica, Helsinki, Finland). Boric acid was added to the solution periodically to maintain the pH at approximately 7.8–8.0.

Throughout the period of observation (213 days), the bacteria count remained very low—i.e., below 10 counts/milliliter. The aqueous solution gave no evidence of slime, color, or odor. After 213 days' exposure, the various coupons were removed for inspection. The aluminum-alloy coupon was covered with thin uniform, white protective coating of hydrated aluminum and had incurred a very low corrosion rate of 0.19 mil per year. The weight loss for the aluminum corresponded essentially to the amount of aluminum required to form the protective coating. The copper and steel coupons were free of visible corrosion products and showed negligible corrosion rates of 0.005 mil per year and 0.012 mil per year, respectively. That is, the invention was extremely effective. Given reasonable precautions (e.g., sterilization of any equipment added to the loop and avoidance of accidental introduction of bacteria in the event make-up solution is required), such a system should operate virtually corrosion-free for years.

EXAMPLE 2

In this experiment, the invention was employed to maintain virtually corrosion-free conditions in a closed loop throughout which 80 gallons of 20% methanol-water solution was circulated continuously at a temperature in the range of 28° to 48° F. The loops included components composed respectively of steel, copper alloy, and aluminum alloy. For example, the system included an aluminum alloy (Type 1100) heat exchanger. To determine the effectiveness of the invention, weighed coupons composed respectively of steel, aluminum alloy, and copper were mounted in the loop in immersed condition.

In accordance with the invention, at the beginning of the test the following were added to the methanol-water solution: 1000 ppm sodium nitrite; 1000 ppm sodium tetraborate; 500 ppm sodium metasilicate; 5 ppm tolyltriazole; and 30 ppm biodegradable organic biocide. The pH of the resulting solution was 11.0 and was adjusted to 7.5 by addition of boric acid. The loop then was operated for a test period of 1000 hours, during which the bacterial count was measured periodically.

At the end of the test period, the coupons were removed and the recirculated solution was inspected. The metal components were extremely clean and free of any deposition, except for a protective white, hydrated film on the aluminum. Their corrosion rates were determined to be as follows: aluminum Type 1100 alloy, 0.0049 mil/yr; copper, 0.0008 mil/yr; steel, 0.0044 mil/yr. The bacteria count in the methanol-water solution was essentially zero.

Other applications for this method include inhibiting corrosion of the above-mentioned metallic materials in closed systems containing various other aqueous media—such as solar-energy collectors in which water is circulated through a metal solar collecting panel. The method also is applicable to low-temperature water-cooled heat exchanger systems, including those where ethylene glycol is dissolved in the water to prevent freezing.

The three major categories of corrosion inhibitors which are commonly employed in water treatment may be classified as pH buffers, film formers, and complexing or chelating agents. Our corrosion-inhibiting formulation includes specially selected additives which as a group perform all three of these functions. All of the additives are environmentally acceptable. That is, the inorganic compounds are non-polluting, and the organic compounds are biodegradable. No objectionable elements, such as heavy metals, are contained in the additives. Thus, in our method corrosion is limited to extremely low values (note Examples 1 and 2), yet the treated aqueous medium may be discharged to the environment without violating current regulations.

Referring more specifically to our various additives, the borate and boric acid components are buffers for maintaining the pH at a value minimizing general corrosion rates. Because aluminum is an amphoteric metal, it would be subject to high general corrosion if the pH were relatively high (alkaline region) or relatively low (acidic region). We prefer to operate at a pH in the range of 7.5-8.0, and more particularly in the range of 7.8-8.0. Our nitrite, silicate, and borate additives act as film formers, providing protection against pitting corrosion. The tolyltriazole acts as a complexing agent for preventing the deposition of heavy metals on components of the system; such deposition would result in pitting corrosion of aluminum. The tolyltriazole also is a specific inhibitor for the corrosion of copper-containing components. The biocide employed in Examples 1 and 2 is known to be effective against both fungi and bacteria. An effective amount of any other suitable biodegradable organic biocide may be substituted.

Referring to the foregoing Examples, the concentrations of the various additives were not optimized. Given the teachings herein, one versed in the art may determine the preferred concentrations for a particular application with only routine experimentation.

What is claimed is:

1. In a system wherein an aqueous liquid is in contact only with a metallic material selected from the group consisting of aluminum and aluminum alloys, the method for retarding corrosion of said metallic material, comprising:
    (a) incorporating in said system:
        (1) 2-10 ppm by weight of tolytriazole,
        (2) an effective amount of a biodegradable organic biocide;
        (3) 500-1000 ppm by weight of sodium metasilicate,
        (4) 500-2000 ppm by weight of sodium nitrite, and
        (5) 500-2000 ppm by weight of sodium tetraborate,
        all of these concentrations being based on the weight of water in said system, and
    (b) maintaining the pH of the resulting solution at a value in the range of 7.5 to 8.0 by the addition of boric acid.

2. The method of claim 1 wherein said system is a closed system.

3. The method of claim 1 wherein said liquid is circulated.

4. In a closed system wherein a recirculated aqueous solution is in contact with a metallic material selected from the group consisting of aluminum and aluminum alloys, the method for retarding corrosion of said material consisting of:
    (a) incorporating in said system a composition consisting essentially of:
        (1) 2-10 ppm by weight of tolyltriazole,
        (2) an effective amount of a biodegradable organic biocide,
        (3) 500-1000 ppm by weight of sodium metasilicate,
        (4) 500-2000 ppm by weight of sodium nitrite, and
        (5) 500-2000 ppm by weight of sodium tetraborate,
        all of these concentrations being based on the weight of water in said system, and
    (b) maintaining the pH of the resulting solution at a value in the range of 7.5 to 8.0 by the addition of boric acid.

5. The method of claim 4 wherein said solution comprises an organic compound and water.

* * * * *